(12) United States Patent
Matsuoka

(10) Patent No.: US 8,574,319 B2
(45) Date of Patent: Nov. 5, 2013

(54) SOLID ELECTROLYTIC CAPACITOR AND METHOD OF MANUFACTURING THE SAME

(75) Inventor: Keiko Matsuoka, Izumisano (JP)

(73) Assignee: SANYO Electric Co., Ltd., Moriguchi-shi, Osaka (JP)

(*) Notice: Subject to any disclaimer, the term of this patent is extended or adjusted under 35 U.S.C. 154(b) by 309 days.

(21) Appl. No.: 13/090,513

(22) Filed: Apr. 20, 2011

(65) Prior Publication Data

US 2011/0261505 A1    Oct. 27, 2011

(30) Foreign Application Priority Data

Apr. 22, 2010  (JP) ................................. 2010-098928

(51) Int. Cl.
*H01G 9/00*       (2006.01)
(52) U.S. Cl.
USPC ........................................................ 29/25.03
(58) Field of Classification Search
None
See application file for complete search history.

(56) References Cited

U.S. PATENT DOCUMENTS

| | | | |
|---|---|---|---|
| 2004/0094321 A1* | 5/2004 | Nakamura | 174/52.1 |
| 2005/0271932 A1* | 12/2005 | Wang Chen | 429/44 |
| 2012/0028433 A1* | 2/2012 | Naito | 438/381 |
| 2012/0106031 A1* | 5/2012 | Vilc et al. | 361/525 |

FOREIGN PATENT DOCUMENTS

JP    2009-218502 A    9/2009

* cited by examiner

*Primary Examiner* — Scott B Geyer
(74) *Attorney, Agent, or Firm* — Westerman, Hattori, Daniels & Adrian, LLP

(57) ABSTRACT

A solid electrolytic capacitor is provided that includes a capacitor element having a dielectric coating, a solid electrolyte, and a cathode lead portion formed in order on a surface of an anode portion having an anode lead portion. The cathode lead portion is electrically connected to a cathode terminal by a connecting portion, and the connecting portion is formed of a sintered body of a metal.

6 Claims, 5 Drawing Sheets

SOLID ELECTROLYTIC CAPACITOR AND METHOD OF MANUFACTURING THE SAME

This nonprovisional application is based on Japanese Patent Application No. 2010-098928 filed on Apr. 22, 2010 with the Japan Patent Office, the entire contents of which are hereby incorporated by reference.

BACKGROUND OF THE INVENTION

1. Field of the Invention

The present invention relates to a solid electrolytic capacitor and a method of manufacturing a solid electrolytic capacitor, and particularly to a solid electrolytic capacitor having a low equivalent series resistance and a method of manufacturing the solid electrolytic capacitor.

2. Description of the Related Art

Conventionally, as a solid electrolytic capacitor, a solid electrolytic capacitor having an anode portion made of a valve metal and a solid electrolyte has been known. As the anode portion, a sintered body of valve metal particles, an etched valve metal plate, and an etched valve metal foil may be used. In the following, a description will be given of a structure of the conventional solid electrolytic capacitor in which a sintered body of valve metal particles is used as an anode portion.

FIG. 6 is a schematic cross section showing an example of the structure of the conventional solid electrolytic capacitor. In FIG. 6, solid electrolytic capacitor 600 includes a capacitor element 60 having a dielectric coating 63, a solid electrolyte 64, and a cathode lead portion 65 that are formed in order on a surface of an anode portion 61 on which an anode lead portion 62 is erected. Anode lead portion 62 has an exposed end connected to an anode terminal 66 through a coupling portion 67 made of a metal, and cathode lead portion 65 is connected to a cathode terminal 68 through an adhesion layer 69. Capacitor element 60 is sealed with an outer coating resin 70.

Dielectric coating 63 may be formed by chemical conversion of anode portion 61 made of a valve metal. For solid electrolyte 64, a conductive polymer formed by chemical polymerization or electrolytic polymerization for example may be used. For cathode lead portion 65, silver or a combination of carbon and silver for example may be used.

Solid electrolytic capacitor 600 as described above has a remarkably compact and highly durable dielectric coating formed therein, and therefore can be downsized without reduction of the capacitance, as compared with other capacitors such as paper capacitor and film capacitor, for example. Further, the conductive polymer has a high electrical conductivity, and the equivalent series resistance (hereinafter "ESR") of the solid electrolytic capacitor can be reduced.

As a material that forms adhesion layer 69 connecting cathode lead portion 65 and cathode terminal 68, a conductive paste is widely used (Japanese Patent Laying-Open No. 2009-218502). The conductive paste refers to a paste of a mixture of an adhesive having adhesiveness and a metal filler having electrical conductivity. The paste is applied between cathode lead portion 65 and cathode terminal 68 and thereafter heated so that the adhesive is set. In this way, cathode lead portion 65 and cathode terminal 68 can be fixed to each other, and adhesion layer 69 having electrical conductivity can be formed.

However, adhesion layer 69 contains the electrically conductive metal filler and also contains the electrically insulating adhesive, which results in a problem that adhesion layer 69 itself has a resistance. The fact that adhesion layer 69 itself has a resistance results in a problem of an increased ESR of solid electrolytic capacitor 600.

FIG. 7 shows a schematic enlarged view of a region A in FIG. 6. It is known that insulating layers 73a, 73b without metal filler 72 are formed on the surface where adhesion layer 69 contacts cathode lead portion 65 and the surface where adhesion layer 69 contacts cathode terminal 68, respectively. Such insulating layers 73a, 73b cause a contact resistance between adhesion layer 69 and cathode lead portion 65 and a contact resistance between adhesion layer 69 and cathode terminal 68, which leads to a problem of a further increased ESR of solid electrolytic capacitor 600.

SUMMARY OF THE INVENTION

According to a first aspect of the present invention, a solid electrolytic capacitor includes a capacitor element having a dielectric coating, a solid electrolyte, and a cathode lead portion formed in order on a surface of an anode portion having an anode lead portion, the cathode lead portion is electrically connected to a cathode terminal by a connecting portion, and the connecting portion is formed of a sintered body of a metal.

According to a second aspect of the present invention, a solid electrolytic capacitor includes a plurality of capacitor elements each having a dielectric coating, a solid electrolyte, and a cathode lead portion formed in order on a surface of an anode portion having an anode lead portion, the plurality of capacitor elements are superposed on each other, the cathode lead portion of at least one capacitor element of the plurality of capacitor elements is electrically connected to a cathode terminal by a first connecting portion, cathode lead portions adjacent to each other of the plurality of capacitor elements are electrically connected to each other by a second connecting portion, and at least one of the first connecting portion and the second connecting portion is formed of a sintered body of a metal.

According to a third aspect of the present invention, a method of manufacturing a solid electrolytic capacitor is provided, the solid electrolytic capacitor includes a capacitor element having a dielectric coating, a solid electrolyte, and a cathode lead portion formed in order on a surface of an anode portion having an anode lead portion, and the method includes the steps of: superposing a connecting member and a cathode terminal in this order on a surface of the cathode lead portion to form a laminated body; and heating the laminated body. The connecting member is formed of metal nanoparticles and a solvent, and the heating step removes the solvent and sinters the metal nanoparticles to form a sintered body which fixes the cathode lead portion and the cathode terminal to each other.

According to a fourth aspect of the present invention, a method of manufacturing a solid electrolytic capacitor is provided, the solid electrolytic capacitor includes a plurality of capacitor elements each having a dielectric coating, a solid electrolyte, and a cathode lead portion formed in order on a surface of an anode portion having an anode lead portion, and the plurality of capacitor elements are superposed on each other. The method includes the steps of: superposing a connecting member and a cathode terminal in this order on a surface of the cathode lead portion of at least one capacitor element of the plurality of capacitor elements to form a laminated body; and heating the laminated body. The connecting member is formed of metal nanoparticles and a solvent, and the heating step removes the solvent and sinters the metal nanoparticles to form a sintered body which fixes the cathode lead portion and the cathode terminal to each other.

According to a fifth aspect of the present invention, a method of manufacturing a solid electrolytic capacitor is provided, the solid electrolytic capacitor includes a plurality of capacitor elements each having a dielectric coating, a solid electrolyte, and a cathode lead portion formed in order on a surface of an anode portion having an anode lead portion, and the plurality of capacitor elements are superposed on each other. The method includes the steps of: superposing, on a surface of the cathode lead portion of one capacitor element of the plurality of capacitor elements, a connecting member and the cathode lead portion of another capacitor element in this order to form a laminated body; and heating the laminated body. The connecting member is formed of metal nanoparticles and a solvent, and the heating step removes the solvent and sinters the metal nanoparticles to form a sintered body which fixes the cathode lead portion of the one capacitor element and the cathode lead portion of that another capacitor element to each other.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
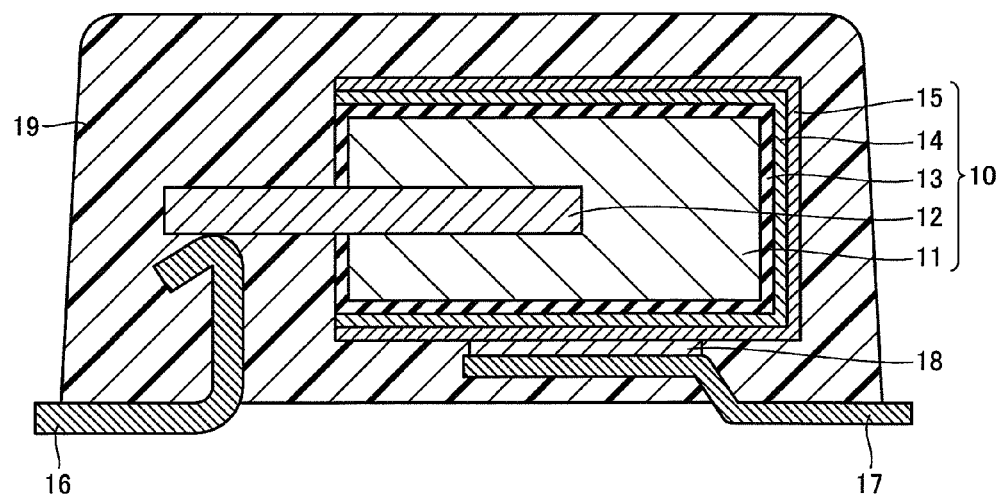
FIG. 1 is a cross section schematically showing an example of a structure of a solid electrolytic capacitor according to a first embodiment.

Embodiments of the present invention will hereinafter be described based on the drawings. In the following drawings, the same or corresponding components are denoted by the same reference numerals, and a description thereof will not be repeated. It is noted that the relation in dimension such as length, size, and width in the drawings is changed as appropriate for the sake of clarification and simplification of the drawings, and does not represent the actual dimensional relation.

<Solid Electrolytic Capacitor>
<<First Embodiment>>

In the following, a preferred example of a solid electrolytic capacitor of the present invention will be described. Here, a description will be given of a solid electrolytic capacitor including a capacitor element having an anode portion formed of a sintered body.

FIG. 1 is a cross section schematically showing an example of a structure of the solid electrolytic capacitor according to a first embodiment.

In FIG. 1, solid electrolytic capacitor 100 includes a capacitor element 10 having a dielectric coating 13, a solid electrolyte 14, and a cathode lead portion 15 that are formed in order on a surface of an anode portion 11 on which an anode lead portion 12 is erected. Anode lead portion 12 has an end exposed from anode portion 11 and electrically connected to an anode terminal 16, and cathode lead portion 15 is electrically connected to a cathode terminal 17 by a connecting portion 18. Capacitor element 10, one end of anode terminal 16 that is connected to anode lead portion 12, and one end of cathode terminal 17 that is connected to connecting portion 18 are sealed by an outer coating resin 19, for example, epoxy resin.

In the above-described solid electrolytic capacitor 100, anode portion 11 is a sintered body of valve metal particles in which one end of anode lead portion 12 is embedded. Anode lead portion 12 has the other end exposed from anode portion 11, and anode lead portion 12 is, as a whole, erected on anode portion 11, which may be produced for example by molding valve metal powder with one end of anode lead portion 12 embedded therein, and sintering the molded body. Examples of the valve metal include tantalum, niobium, titanium, and aluminum. The material for anode lead portion 12 is not particularly limited as long as the material is a metal. A preferred material is a valve metal.

Dielectric coating 13 is an oxide film formed through a chemical conversion performed on anode portion 11, and covers the whole surface of anode portion 11. Solid electrolyte 14 is formed on dielectric coating 13, and made of manganese dioxide, conductive polymer or the like. As the conductive polymer, a known conductive polymer may be used, and examples of the conductive polymer include polythiophene and its derivatives, polypyrrole and its derivatives, polyaniline and its derivatives, and polyflan and its derivatives.

Cathode lead portion 15 covering the surface of solid electrolyte 14 may be any as long as it has electrical conductivity, and a silver paint layer made of silver for example may be used as cathode lead portion 15. Alternatively, cathode lead portion 15 may have a double layer structure including a carbon layer as an inner layer and a silver paint layer as an outer layer. The carbon layer and the silver paint layer can be formed following a known technique. Anode terminal 16 and cathode terminal 17 may be any as long as they are made of a metal, and copper for example may be used for anode terminal 16 and cathode terminal 17. One end of anode terminal 16 and the exposed end of anode lead portion 12 may be electrically connected by welding, for example. One end of cathode terminal 17 and cathode lead portion 15 are fixed to each other by connecting portion 18.

Connecting portion 18 is formed of a sintered body of a metal. The metal may be any as long as the metal has electrical conductivity and is not limited to a particular one. In view of the fact that silver has a low volume resistivity and has a particularly low connection resistance when the surface with which silver is in contact is copper or gold, silver is preferred. An example of the method of forming connecting portion 18 formed of a sintered body will be described below.

First, a solvent mixture in which metal nanoparticles with an average particle size of 100 nm or less are mixed with a solvent is applied on one flat surface of cathode terminal 17. The solvent mixture is prepared by mixing metal nanoparticles with a solvent which allows the metal nanoparticles to be dispersed therein, and the content of the metal nanoparticles in the solvent mixture is preferably 85% by mass or more. In order to promote dispersion of the metal nanoparticles, the surface of metal nanoparticles may be surfacetreated. The average particle size herein refers to an average of the diameter of particles, and the diameter of particles can be measured by a TEM (Transmission Electron Microscope).

Next, cathode lead portion 15 of capacitor element 10 is placed on the applied solvent mixture, and accordingly a laminated body is formed in which cathode terminal 17, the solvent mixture, and cathode lead portion 15 are laid on each other in this order. The laminated body is then heated at a temperature of not more than the melting point of the metal nanoparticles to remove the solvent and sinter the metal nanoparticles and thereby form connecting portion 18 formed of the sintered body and fixing cathode lead portion 15 and cathode terminal 17 to each other. In particular, heating at a temperature of not lower than the temperature at which the solvent vaporizes can efficiently remove the solvent.

In solid electrolytic capacitor 100 of the present embodiment described above, connecting portion 18 formed in the above-described manner is a sintered body and contains no insulating adhesive unlike the conventional solid electrolytic capacitor, and therefore, the resistance of connecting portion 18 itself is remarkably low. Further, unlike the conventional solid electrolytic capacitor, no insulating layer is formed on the surface where connecting portion 18 and cathode lead portion 15 contact and the surface where connecting portion 18 and cathode terminal 17 contact, and therefore, the contact resistance does not occur or is extremely low. The ESR of solid electrolytic capacitor 100 is accordingly low and the solid electrolytic capacitor of high performance can be obtained.

In the heating process performed for forming the sintered body, the melting point of the metal nanoparticles is significantly lower than the conventional metal particles, for example, metal particles with an average particle size of approximately 50 μm, and therefore, the metal nanoparticles can be sintered at a low temperature. Therefore, no degradation of the solid electrolytic capacitor due to heating at a high temperature of each part will occur.

Further, the sintered body which forms connecting portion 18 is preferably made of silver. Such a sintered body can be formed using silver nanoparticles as metal nanoparticles. In the case where connecting portion 18 is a sintered body of silver, advantageously the connection resistance is particularly low when the surface with which the sintered body is in contact is copper or gold. While the melting point of metal particles that are not of nano order (larger than 1 μm) is a very high temperature of 500 to 600° C., the melting point of the silver nanoparticles is 100 to 300° C.

Further, it is preferable that the thickness in the top-bottom direction in FIG. 1 of connecting portion 18 is not less than 10 μm and not more than 30 μm. Connecting portion 18 having this thickness can suppress generation of cracks in connecting portion 18.

Further, while connecting portion 18 is preferably formed of a sintered body which is entirely of sintered metal nanoparticles, the sintered body may contain a metal filler. Connecting portion 18 containing the metal filler can reduce the manufacturing cost of solid electrolytic capacitor 100.

<<Second Embodiment>>

In the following, another preferred example of a solid electrolytic capacitor of the present invention will be described using FIGS. 2 and 3. Here, a description will be given using a solid electrolytic capacitor including a capacitor element having an anode portion formed of a valve metal plate.

Figure 2:
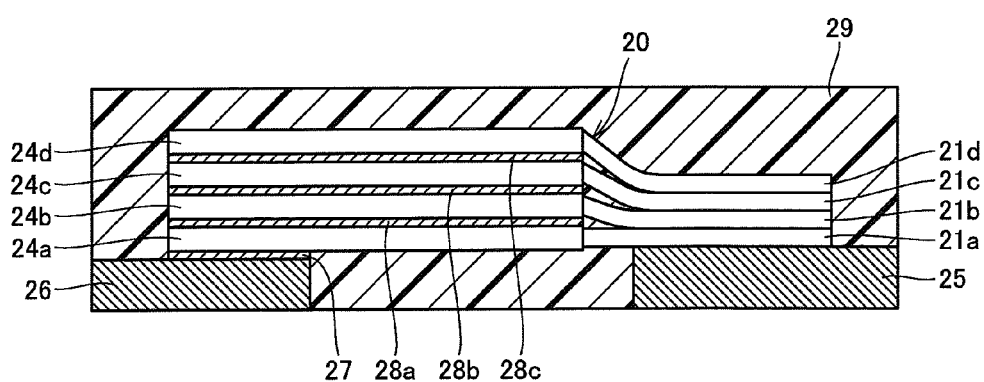
FIG. 2 is a cross section schematically showing an example of a structure of a solid electrolytic capacitor according to a second embodiment.
Figure 3:
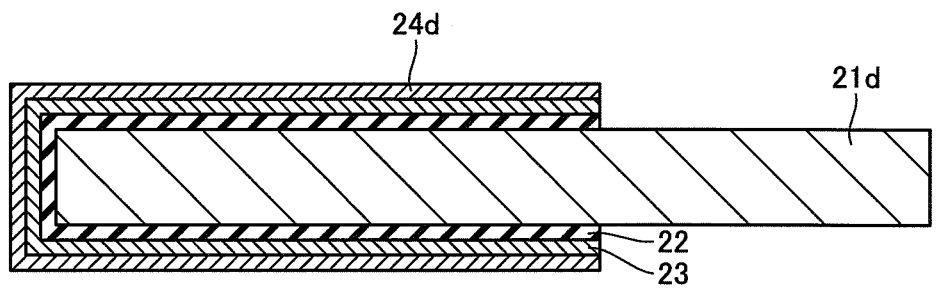
FIG. 3 is a cross section schematically showing an example of a structure of a top capacitor element in FIG. 2.

FIG. 2 is a cross section schematically showing an example of a structure of the solid electrolytic capacitor of a second embodiment, and FIG. 3 is a cross section schematically showing an example of the structure of the top capacitor element in FIG. 2.

In FIG. 2, solid electrolytic capacitor 200 includes four capacitor elements 20. Capacitor element 20 as shown in FIG. 3 has the structure in which a dielectric coating 22, a solid electrolyte 23, and a cathode lead portion 24d are formed in order on the surface of an anode lead portion 21d. While FIG. 3 is a cross section schematically showing the structure of top capacitor element 20 in FIG. 2, capacitor elements 20 are all structured similarly.

Referring again to FIG. 2, in solid electrolytic capacitor 200, four capacitor elements 20 are aligned so that respective anode lead portions 21a to 21d are oriented identically and respective cathode lead portions 24a to 24d are oriented identically, and superposed on each other along the top-bottom direction in FIG. 2. Of the four capacitor elements 20, the lowermost capacitor element 20 has cathode lead portion 24a electrically connected by a first connecting portion 27 to cathode terminal 26, and cathode lead portions 24a to 24d adjacent to each other are electrically connected by second connecting portions 28a to 28c, respectively. Further, four capacitor elements 20 have respective anode lead portions 21a to 21d that are bent so that they are located adjacent to each other. Furthermore, anode lead portion 21a of the lowermost capacitor element 20 in FIG. 2 is welded to be electrically connected to anode terminal 25. Four capacitor elements 20 are sealed by an outer coating resin 29.

Anode lead portions 21a to 21d are each a metal plate of a valve metal with a roughened surface, which can be formed by etching a surface of a valve metal plate, for example. Examples of the valve metal include tantalum, niobium, titanium, and aluminum. Dielectric coating 22, solid electrolyte 23, cathode lead portions 24a to 24d, anode terminal 25, cathode terminal 26, and outer coating resin 29 are similar respectively to dielectric coating 13, solid electrolyte 14, cathode lead portion 15, anode terminal 16, cathode terminal 17, and outer coating resin 19, and therefore, the description of each will not be repeated.

In the present embodiment, at least one of first connecting portion 27 and second connecting portions 28a to 28c is formed of a sintered body of a metal. First, a description will be given of an example of the method of forming first connecting portion 27 in the case where first connecting portion 27 is formed of a sintered body of a metal.

First connecting portion 27 formed of a sintered body of a metal can be formed following a method substantially similar to the method of forming connecting portion 18 in the first embodiment, for example. Specifically, a solvent mixture in which metal nanoparticles with an average particle size of 100 nm or less are mixed with a solvent is used, a laminated body in which cathode terminal 26, the solvent mixture, and cathode lead portion 24a are superposed in this order is formed, and thereafter this laminated body is heated at a temperature of the melting point or lower of the metal nanoparticles.

In this way, the solvent is removed and the metal nanoparticles are sintered to form first connecting portion 27 formed of a sintered body and fixing cathode lead portion 24a and cathode terminal 26 to each other. In particular, because the vaporizing temperature of the solvent is lower than the heating temperature, the solvent can efficiently be removed. In this case, after four capacitor elements 20 are fixed to each other by second connecting portions 28a to 28c, the solvent mixture may be applied to the exposed surface of cathode lead portion 24a, or the solvent mixture may be applied to cathode lead portion 24a of a single capacitor element 20.

Next, a description will be given of the method of forming second connecting portions 28a to 28c in the case where second connecting portions 28a to 28c are each formed of a sintered body of a metal. Four capacitor elements 20 are herein referred to as first to fourth capacitor elements from the bottom one in FIG. 2 for convenience sake.

First, a solvent mixture in which metal nanoparticles with an average particle size of 100 nm or less are mixed with a solvent is applied to one surface of cathode lead portion 24a of first capacitor element 20, and cathode lead portion 24b of second capacitor element 20 is placed on the applied solvent mixture. Next, on the surface opposite to the surface of cathode lead portion 24b of second capacitor element 20 that is in contact with the solvent mixture, the solvent mixture is further applied, and cathode lead portion 24c of third capacitor element 20 is placed on this solvent mixture. Further, on the surface opposite to the surface of cathode lead portion 24c of third capacitor element 20 that is in contact with the solvent mixture, the solvent mixture is further applied, and cathode lead portion 24d of fourth capacitor element 20 is placed on this solvent mixture.

Through the process above, a laminated body is formed in which the solvent mixture is provided between cathode lead portions 24a to 24d of first to fourth capacitor elements 20. Then, this laminated body is heated at a temperature of not more than the melting point of the metal nanoparticles to sinter the metal nanoparticles and thereby form second connecting portions 28a to 28c of the sintered body that fix adjacent cathode lead portions 24a to 24d to each other, respectively. In particular, because the vaporizing temperature of the solvent is lower than the heating temperature, the solvent can efficiently be removed.

In the case where second connecting portions 28a to 28c in solid electrolytic capacitor 200 of the present embodiment as described above are each a sintered body, the second connecting portions contain no insulating adhesive and therefore the resistance of second connecting portions 28a to 28c themselves is remarkably low. Further, because no insulating layer is formed on the surface where second connecting portions 28a to 28c and cathode lead portions 24a to 24d contact each other, the contact resistance is not generated or is remarkably low. Accordingly, the ESR of solid electrolytic capacitor 100 is low and the solid electrolytic capacitor of high performance can be obtained.

In the case where first connecting portion 27 is a sintered body as well, the resistance of first connecting portion 27 itself is remarkably low and no insulating layer is formed on the surface where first connecting portion 27 and cathode lead portion 24a contact each other and the surface where first connecting portion 27 and cathode terminal 26 contact each other, and therefore, the contact resistance is not generated or is remarkably low. Accordingly, the ESR of solid electrolytic capacitor 100 is low and the solid electrolytic capacitor of high performance can be obtained.

Preferably, the sintered body which forms first connecting portion 27 or second connecting portions 28a to 28c is silver. Such a sintered body can be formed by using silver nanoparticles as metal nanoparticles. First connecting portion 27 and/or second connecting portions 28a to 28c formed of a silver sintered body provide an advantage that the connection resistance is particularly low when the surface with which they are in contact is copper or gold.

Further, preferably the thickness in the top-bottom direction in FIG. 2 of the metal sintered body is not less than 10 μm and not more than 30 μm. When the metal sintered body has this thickness, generation of cracks in the sintered body can be suppressed.

While the sintered body is more preferably a sintered body entirely made up of sintered metal nanoparticles, the sintered body may contain a metal filler. The metal filler can be contained to reduce the manufacturing cost.

In connection with the present embodiment, the case has been described in detail in which second connecting portions 28a to 28c are all formed of a metal sintered body, or first connecting portion 27 is formed of a metal sintered body. The present invention, however, is not limited to this. For example, at least one of second connecting portions 28a to 28c may be a sintered body of a metal, or all of first connecting portion 27 and second connecting portions 28a to 28c may be a sintered body of a metal.

The solid electrolytic capacitor of the present invention has been described in detail in connection with the first and second embodiments. The solid electrolytic capacitor of the present invention, however, is not limited to the solid electrolytic capacitors of the first and second embodiments described above, and is applicable to solid electrolytic capacitors of other known forms. Examples of the solid electrolytic capacitors of other known forms include a wound-type solid electrolytic capacitor, a stack-type solid electrolytic capacitor in which a valve metal foil is used as the anode portion, and the like.

<Method of Manufacturing Solid Electrolytic Capacitor>
<<Third Embodiment>>

In the following, a preferred example of the method of manufacturing a solid electrolytic capacitor of the present invention will be described. Here, a description will be given of a method of manufacturing a solid electrolytic capacitor including a capacitor element having an anode portion formed of a sintered body. FIGS. 4A to 4D are schematic cross sections illustrating an example of the method of manufacturing a solid electrolytic capacitor in a third embodiment, and the structure of the solid electrolytic capacitor to be manufactured is similar to that of solid electrolytic capacitor 100 in the first embodiment.

1. Preprocess

Figure 4A:
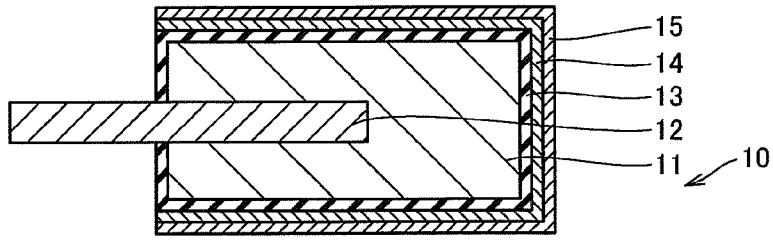
FIGS. 4A to 4D are schematic cross sections illustrating an example of a method of manufacturing a solid electrolytic capacitor according to a third embodiment.

In this process, capacitor element 10 shown in FIG. 4A is produced. First, a known technique is followed to form anode portion 11 on which anode lead portion 12 is erected. Anode portion 11 shown in FIG. 4A can be formed for example in the following way. One end in the longitudinal direction of anode lead portion 12 is embedded in valve metal powder and, in this state, the powder is molded into a desired shape. The molded body is thereafter sintered to form the anode portion. As the valve metal, tantalum, niobium, titanium, aluminum, or the like may be used. Anode lead portion 12 may be made of a metal, and particularly a valve metal may effectively be used.

Next, a known chemical conversion is performed on anode portion 11 to form dielectric coating 13 on the surface of anode portion 11. The chemical conversion can be performed for example by immersing anode portion 11 in an aqueous solution of phosphoric acid and applying a voltage to anode portion 11.

Subsequently, solid electrolyte 14 is formed on the surface of dielectric coating 13. Solid electrolyte 14 is preferably made of a conductive polymer, since the conductive polymer has a high electrical conductivity. The conductive polymer can be formed for example by known chemical polymerization or known electrolytic polymerization. Both the chemical polymerization and the electrolytic polymerization may also be used.

A monomer used for the chemical polymerization and the electrolytic polymerization is preferably at least one of aliphatic compounds, aromatic compounds, heterocyclic compounds, and heteroatom-contained compounds. In particular, thiophene and its derivatives, pyrrole and its derivatives, aniline and its derivatives, and flan and its derivatives are preferred. Solid electrolyte 14 made of a conductive polymer obtained by polymerization of these monomers can form a thin film and is excellent in electrical conductivity.

Next, cathode lead portion 15 is formed on solid electrolyte 14. Cathode lead portion 15 may be any as long as it is electrically conductive, and may for example be a silver paint layer. Alternatively, cathode lead portion 15 may have a double layer structure in which a carbon layer is an inner layer and a silver paint layer is an outer layer. The carbon layer and the silver paint layer can be formed by means of a known technique.

For example, the carbon layer can be formed by immersing anode portion 11 on which solid electrolyte 14 is formed, in a solution in which carbon particles are dispersed, and thereafter drying it to form the carbon layer. After this, it may be immersed in a solution containing silver particles, drawn out of the solution, and dried to form a silver paint layer on the carbon layer or cathode lead portion 15. Through the above-described process, capacitor element 10 shown in FIG. 4A is produced.

2. Process of Forming Laminated Body (Laminated Body Forming Process)

Figure 4B:
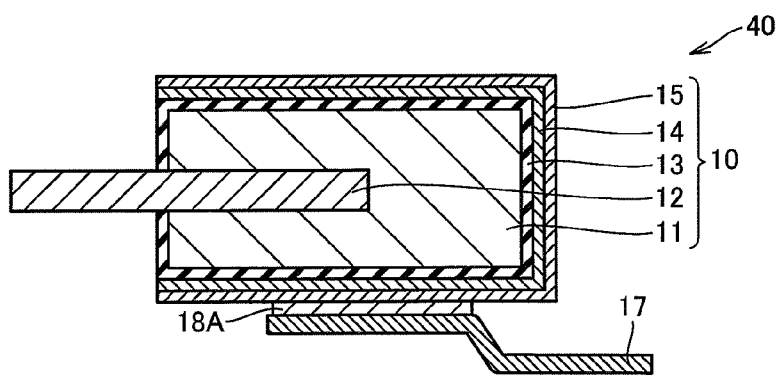
Figure 4C:
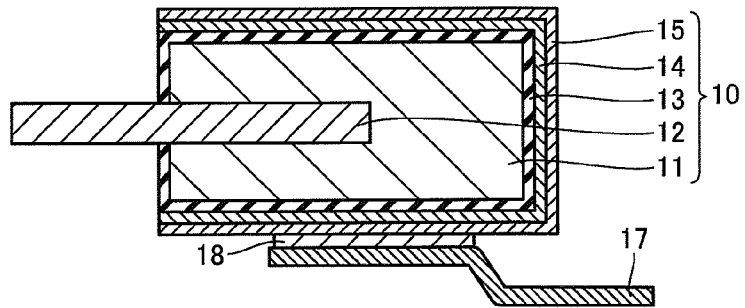

On the surface of cathode lead portion 15 of capacitor element 10 produced in the above-described preprocess, a connecting member 18A which is a material for connecting portion 18 as well as cathode terminal 17 are superposed in this order to form a laminated body 40 shown in FIG. 4B.

Specifically, connecting member 18A which is a material for connecting portion 18 is applied onto one surface on one end of cathode terminal 17, and cathode lead portion 15 of capacitor element 10 is placed thereon. Connecting member 18A may be applied or screen-printed on the surface of cathode terminal 17. The surface where connecting member 18A and cathode terminal 17 contact each other and the surface where connecting member 18A and cathode lead portion 15 contact each other are opposite to each other.

Connecting member 18A is a solvent mixture in which metal nanoparticles with a diameter of 100 nm or less are mixed with a solvent. The solvent may be any as long as the solvent allows the metal nanoparticles to disperse and can be vaporized at the temperature at which the metal nanoparticles are sintered. The metal is preferably silver, since it offers an advantage that the connection resistance is low particularly when the surface it contacts is copper or gold. Further, in order to promote dispersion of the metal nanoparticles, a dispersant may be attached in advance to the surface of the metal nanoparticles.

A higher content of the metal nanoparticles in the solvent mixture is preferred. A higher content of the metal nanoparticles can reduce an amount of change in volume of the member due to a heating process described later herein, and prevent the sintered body from being cracked. In particular, where the content of the metal nanoparticles in the solvent mixture is 85% by mass or more, occurrence of cracks can be suppressed. Further, where the content is 90% by mass or more, occurrence of cracks can more effectively be suppressed.

In the case where the thickness of connecting member 18A applied on cathode terminal 17 exceeds 100 μm, cracks are more likely to be generated after sintering. In the case where this thickness is less than 5 μm, the strength after sintering tends to be low. The thickness of connecting member 18A is thus preferably not less than 5 μm and not more than 100 μm.

3. Process of Heating Laminated Body (Laminated Body Heating Process)

Next, laminated body 40 formed in the above-described laminated body forming process is heated. This process removes the solvent from connecting member 18A in laminated body 40 and sinters the metal nanoparticles. The metal nanoparticles are sintered to form connecting portion 18 formed of a sintered body to fix cathode lead portion 15 and cathode terminal 17 to each other (see FIG. 4C).

The heating temperature in this process may be any as long as the heating temperature is not higher than the temperature at which the metal nanoparticles are sintered, namely not higher than the melting point (Celsius degree) of the metal nanoparticles, and not less than 90% of the melting point (Celsius degree). For example, in the case where silver nanoparticles are used as the metal nanoparticles, laminated body 40 can be heated at a temperature in the range of not lower than 120° C. and not higher than 220° C. to form connecting portion 18 formed of a sintered body. A solvent having the vaporizing temperature lower than the heating temperature can be used to efficiently remove the solvent.

While the time for heating in this process varies depending on whether heating is done directly with a hot plate or the like or heating is done in a temperature atmosphere like an oven, the time for heating is preferably not shorter than one minute and not longer than two hours in any case. The heating time of one minute or longer can increase the rate of removal of the solvent. The heating time of two hours or shorter can suppress degradation of solid electrolyte 14 due to heating, and can also shorten the Takt time.

In this process, laminated body 40 may be heated while being pressurized in the direction of thickness of laminated body 40. The pressure applied in the thickness direction of laminated body 40 to thereby compress connecting member 18A can effectively suppress generation of cracks while the metal nanoparticles are sintered. In the case where this pressurization is performed, the content of the metal nanoparticles in connecting member 18A is not particularly limited, while it is preferable to avoid an extremely lower content of the metal nanoparticles in order to prevent generation of voids.

4. Postprocess

Figure 4D:
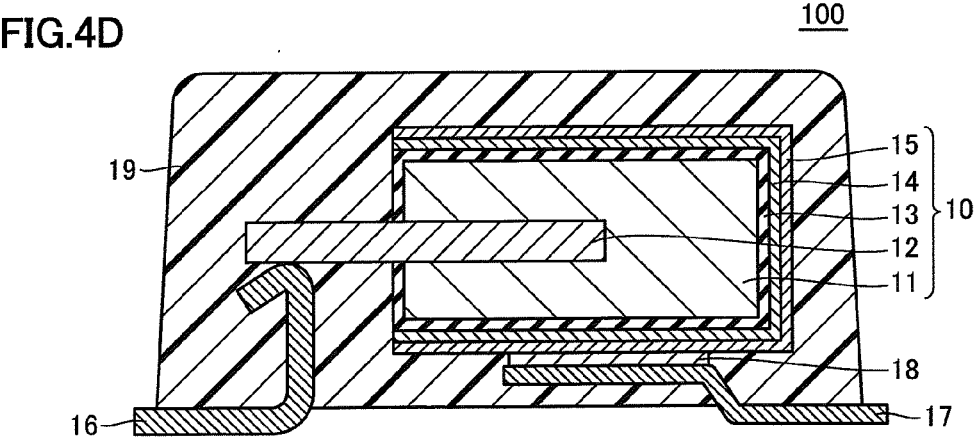

After the above-described heating process, a postprocess as described below is performed to manufacture solid electrolytic capacitor 100 shown in FIG. 4D. Specifically, first of all, to the exposed end of anode lead portion 12, anode terminal 16 is welded. Then, capacitor element 10, one end of anode terminal 16 that is connected to anode lead portion 12, and one end of cathode terminal 17 that is connected to connecting portion 18 are sealed with outer coating resin 19, which is for example an epoxy resin, to manufacture solid electrolytic capacitor 100.

In solid electrolytic capacitor 100 manufactured in the present embodiment as described above, connecting portion 18 formed in the above-described manner contains no insulating adhesive unlike the conventional solid electrolytic capacitor, and therefore, the resistance of connecting portion 18 itself is remarkably low. Further, unlike the conventional solid electrolytic capacitor, on the surface where connecting portion 18 and cathode lead portion 15 contact each other and on the surface where connecting portion 18 and cathode terminal 17 contact each other, no insulating layer is formed. Thus, the contact resistance is not generated or is extremely low. Accordingly, solid electrolytic capacitor 100 has a low internal resistance and the solid electrolytic capacitor of high performance can be provided.

Further, the metal nanoparticles have a very low melting point than conventional metal particles such as for example metal particles with an average particle size of approximately 50 μm, and therefore can be sintered at a low temperature. Accordingly, metal nanoparticles can be used to form connecting portion 18 and effectively suppress degradation due to heating at a high temperature of each member.

Furthermore, the thickness in the top-bottom direction in FIG. 1 of connecting portion 18 is preferably not less than 10 μm and not more than 30 μm. This thickness of connecting portion 18 can suppress generation of cracks in connecting portion 18. While connecting portion 18 is more preferably formed entirely of a sintered body in which metal nanoparticles are sintered, a metal filler may be contained in the sintered body. Use of the metal filler contained therein can reduce the manufacturing cost.

<<Fourth Embodiment>>

In the following, another preferred example of the method of manufacturing a solid electrolytic capacitor of the present invention will be described. Here, a description will be given of a method of manufacturing a solid electrolytic capacitor having an anode portion formed of a valve metal plate. FIGS. 5A to 5D are schematic cross sections illustrating an example of the method of manufacturing a solid electrolytic capacitor in a fourth embodiment, and the structure of the solid electrolytic capacitor to be manufactured is similar to that of solid electrolytic capacitor 200 in the second embodiment.

1. Preprocess

Figure 5A:
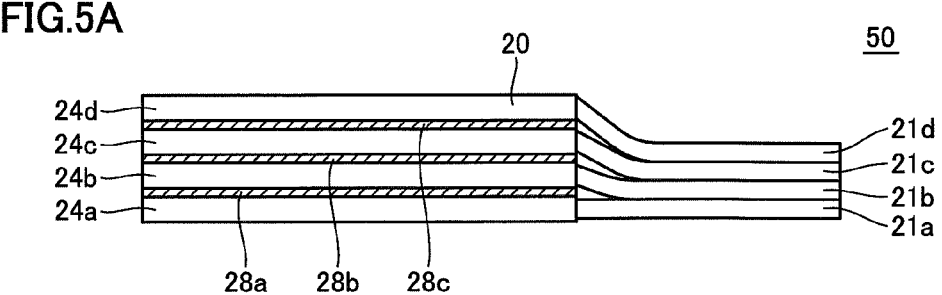
FIGS. 5A to 5D are schematic cross sections illustrating an example of a method of manufacturing a solid electrolytic capacitor according to a fourth embodiment.

In this process, as shown in FIG. 5A, four capacitor elements 20 are produced, and these four capacitor elements 20 are superposed on and fixed to each other to produce a structured body 50.

First, a known technique is followed to produce an anode portion formed of a valve metal plate having a roughened surface. The surface of the valve metal plate can be roughened for example by etching. Then, a known technique is used to form a dielectric coating, a solid electrolyte, and a cathode lead portion on the surface of the anode portion. The anode portion has a part on which the dielectric coating, solid electrolyte, and cathode lead portion are not formed and which is therefore exposed outside, and the exposed part is an anode lead portion. Namely, in four capacitor elements 20 in FIG. 5A, the parts of the anode portions that are not covered respectively with cathode lead portions 24a to 24d are anode lead portions 21a to 21d.

The four capacitor elements 20 thus produced are aligned in the orientation of respective cathode lead portions 24a to 24d and the orientation of respective anode lead portions 21a to 21d. In this state, four capacitor elements 20 are superposed on and fixed to each other. Fixation of capacitor elements 20 to each other can be done for example by using a known conductive adhesive for second connecting portions 28a to 28c. Then, anode lead portions 21a to 21d are bent as appropriate so that they contact each other. The foregoing process produces structured body 50 shown in FIG. 5A.

2. Process of Forming Laminated Body (Laminated Body Forming Process)

Figure 5B:
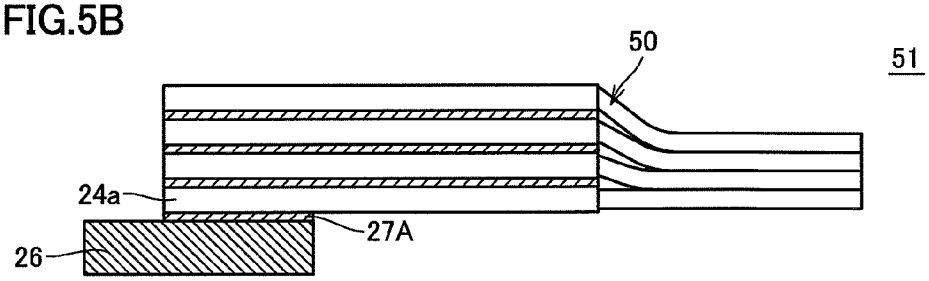
Figure 5C:
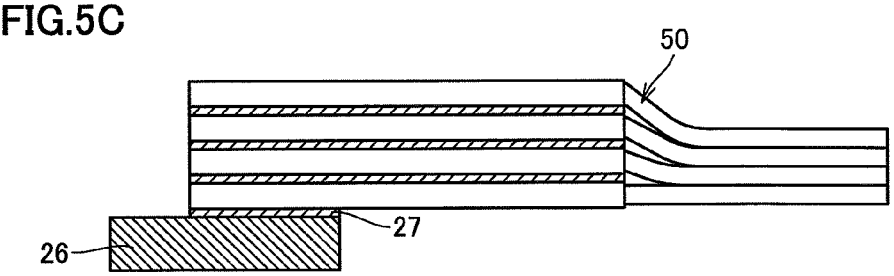

On the exposed surface of cathode lead portion 24a of structured body 50 which has been produced in the above-described preprocess to include four capacitor elements 20 superposed on and fixed to each other, a first connecting member 27A which is a material for first connecting portion 27 as well as cathode terminal 26 are superposed in this order to form a laminated body 51 shown in FIG. 5B.

Specifically, first connecting member 27A which is a material for first connecting portion 27 is applied onto one surface on one end of cathode terminal 26, and the exposed surface of cathode lead portion 24a of structured body 50 is placed thereon. First connecting member 27A may be applied or screen-printed on the surface of cathode terminal 26. The surface where first connecting member 27A and cathode terminal 26 contact each other and the surface where first connecting member 27A and cathode lead portion 24a contact each other are opposite to each other.

First connecting member 27A is a solvent mixture in which metal nanoparticles with a diameter of 100 nm or less are mixed with a solvent. The solvent may be any as long as the solvent allows the metal nanoparticles to disperse and can be vaporized at the temperature at which the metal nanoparticles are sintered. The metal is preferably silver, since it offers an advantage that the volume resistivity is low and the contact resistance is low particularly when the surface it contacts is copper or gold. Further, in order to promote dispersion of the metal nanoparticles, a dispersant may be attached in advance to the surface of the metal nanoparticles.

A higher content of the metal nanoparticles in the solvent mixture is preferred. A higher content of the metal nanoparticles can reduce an amount of change in volume of the member due to a heating process described later herein, and prevent the sintered body from being cracked. In particular, where the content of the metal nanoparticles in the solvent mixture is 85% by mass or more, occurrence of cracks can be suppressed. Further, where the content is 90% by mass or more, occurrence of cracks can more effectively be suppressed.

In the case where the thickness of first connecting member 27A applied on cathode terminal 26 exceeds 100 μm, cracks are more likely to be generated. In the case where this thickness is less than 5 μm, the strength tends to be low. The thickness of connecting member 27A is thus preferably not less than 5 μm and not more than 100 μm.

3. Process of Heating Laminated Body (Laminated Body Heating Process)

Next, laminated body 51 formed in the above-described laminated body forming process is heated. This process removes the solvent from first connecting portion 27A in laminated body 51 and sinters the metal nanoparticles. The metal nanoparticles are sintered to form first connecting portion 27 formed of a sintered body to fix cathode lead portion 24a and cathode terminal 26 to each other (see FIG. 5C).

The heating temperature in this process may be any as long as the heating temperature is not higher than the temperature at which the metal nanoparticles are sintered, namely not higher than the melting point (Celsius degree) of the metal nanoparticles, and not less than 90% of the melting point (Celsius degree). For example, in the case where silver nanoparticles are used as the metal nanoparticles, laminated body 51 can be heated at a temperature in the range of not lower than 120° C. and not higher than 220° C. to form first connecting portion 27 formed of a sintered body. A solvent having the vaporizing temperature lower than the heating temperature can be used to efficiently remove the solvent.

While the time for heating in this process varies depending on whether heating is done directly with a hot plate or the like or heating is done in a temperature atmosphere like an oven, the time for heating is preferably not shorter than one minute and not longer than two hours in any case. The heating time of one minute or longer can increase the rate of removal of the solvent. The heating time of two hours or shorter can suppress degradation of solid electrolyte 14 due to heating, and can also shorten the Takt time.

In this process, laminated body 51 may be heated while being pressurized in the direction of thickness of laminated body 51. The pressure applied in the thickness direction of laminated body 51 to thereby compress the joint member can effectively suppress generation of cracks while the metal nanoparticles are sintered. In the case where this pressurization is performed, the content of the metal nanoparticles in first connecting member 27A is not particularly limited, while it is preferable to avoid an extremely lower content of the metal nanoparticles in order to prevent generation of voids.

4. Postprocess

After the above-described heating process, a postprocess as described below is performed to manufacture solid electrolytic capacitor 200 shown in FIG. 5D. Specifically, first of all, to the exposed end of anode lead portion 21a, anode terminal 25 is welded. Then, laminated body 51 is sealed with outer coating resin 29, which is for example an epoxy resin, to manufacture solid electrolytic capacitor 200.

In solid electrolytic capacitor 200 manufactured in the present embodiment as described above, first connecting portion 27 formed in the above-described manner contains no insulating adhesive unlike the conventional solid electrolytic capacitor, and therefore, the resistance of first connecting portion 27 itself is remarkably low. Further, unlike the conventional solid electrolytic capacitor, on the surface where first connecting portion 27 and cathode lead portion 24a contact each other and on the surface where first connecting portion 27 and cathode terminal 26 contact each other, no insulating layer is formed. Thus, the contact resistance is not generated or is extremely low. Accordingly, solid electrolytic capacitor 200 has a low internal resistance and the solid electrolytic capacitor of high performance can be provided.

Further, the metal nanoparticles have a very low melting point than conventional metal particles such as metal particles with an average particle size of approximately 50 μm, and therefore can be sintered at a low temperature. Accordingly, no degradation resultant from heating at a high temperature of each member is caused.

Figure 5D:
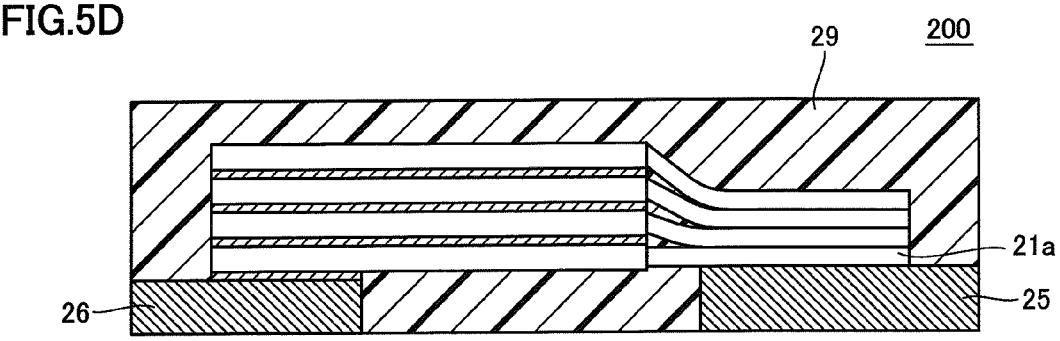
Figure 6:
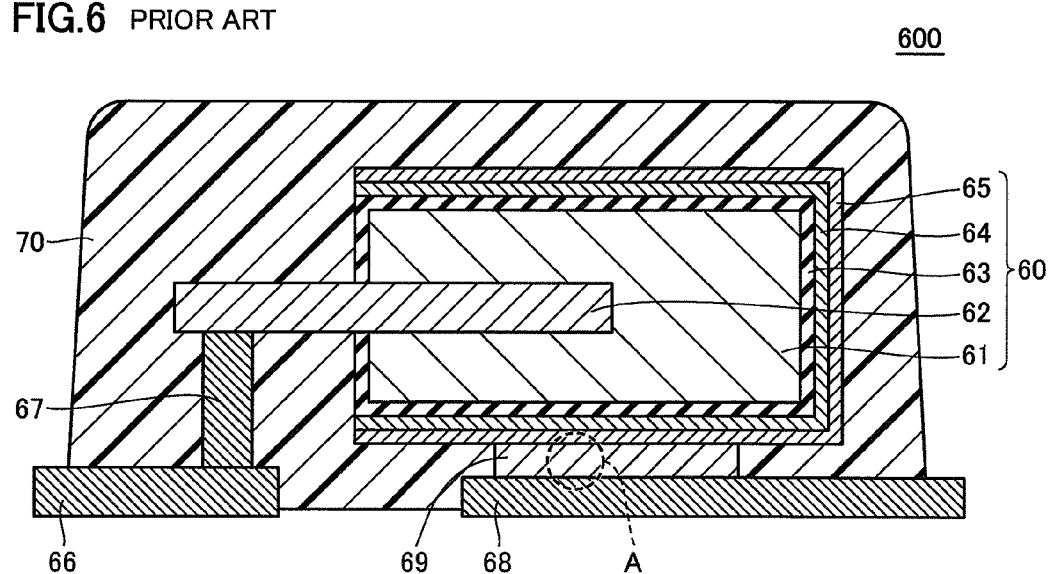
FIG. 6 is a schematic cross section showing an example of a structure of a conventional solid electrolytic capacitor.
Figure 7:
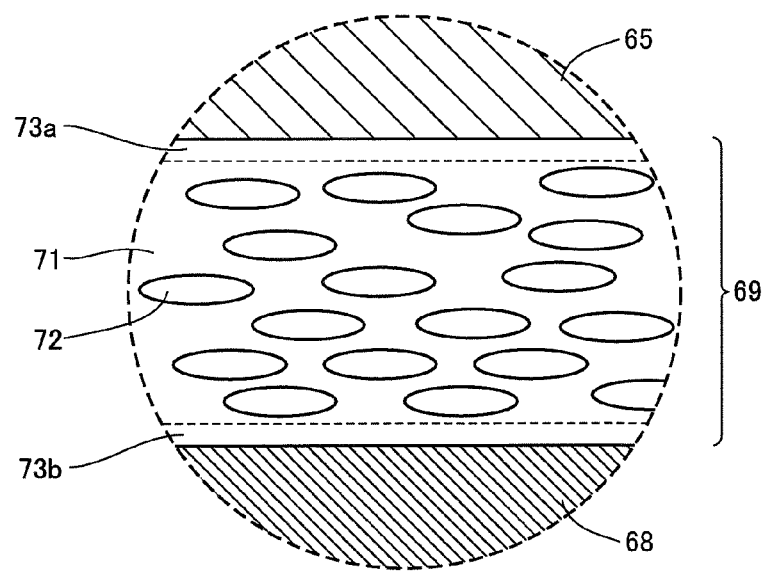
FIG. 7 is a schematic enlarged view of a region A in FIG. 6.

Furthermore, the thickness in the top-bottom direction in FIG. 5D of first connecting portion 27 is preferably not less than 10 μm and not more than 30 μm This thickness of first connecting portion 27 can suppress generation of cracks in first connecting portion 27. While first connecting portion 27 is more preferably formed entirely of a sintered body in which metal nanoparticles are sintered, a metal filler may be contained in the sintered body. Use of the metal filler contained therein can reduce the manufacturing cost.

While the manufacturing method in the present embodiment has been described in which first connecting portion 27 is a sintered body, the solid electrolytic capacitor may be manufactured so that second connecting portions 28a to 28c may each be a sintered body. Further, the solid electrolytic capacitor may also be manufactured so that first connecting portion 27 and second connecting portions 28a to 28c are all sintered bodies, or at least one of them is a sintered body. In connection with a fifth embodiment below, a description will be given of an example of the manufacturing method in which a solid electrolytic capacitor is manufactured so that second connecting portions 28a to 28c are each a sintered body.

<<Fifth Embodiment>>

1. Preprocess

In this process, four capacitor elements 20 are produced. The method of producing capacitor elements 20 is similar to the method of producing capacitor elements 20 in the fourth embodiment, and therefore, the description thereof will not be repeated.

2. Process of Forming Laminated Body (Laminated Body Forming Process)

In this process, four capacitor elements 20 are aligned in orientation and position, and a laminated body is formed in which cathode lead portions 24a to 24d are superposed on each other to be coupled so that a second connecting member which is a material for second connecting portions 28a to 28c is interposed therebetween. The structure of the laminated body at this time differs from the structure of structured body 50 in FIG. 5A only in terms of the member forming second connecting portions 28a to 28c.

For the second connecting member, a solvent mixture formed of metal nanoparticles with a diameter of 100 nm or less and similar to first connecting member 27A described in connection with the fourth embodiment may be used. The appropriate thickness of the second connecting member is also similar to that of first connecting member 27A in the fourth embodiment and therefore the description thereof will not be repeated.

3. Process of Heating Laminated Body (Laminated Body Heating Process)

Next, laminated body formed in the above-described laminated body forming process is heated. This process removes the solvent from the second connecting member in the laminated body and sinters the metal nanoparticles. The metal nanoparticles are sintered to form a sintered body (second connecting portions 28a to 28c) fixing adjacent cathode lead portions 24a to 24d to each other of four capacitor elements 20. The conditions in this process such as appropriate heating temperature and appropriate heating time are similar to the conditions in the laminated body heating process of the fourth embodiment, and therefore, the description thereof will not be repeated.

4. Postprocess

After the above heating process, cathode terminal 26 and the exposed surface of cathode lead portion 24a are electrically connected, anode terminal 25 and the exposed surface of anode lead portion 21a are electrically connected, and further the components are sealed with outer coating resin 29 to thereby manufacture solid electrolytic capacitor 200 (see FIG. 5D). Cathode terminal 26 at this time may be fixed with a conventional conductive adhesive or may also be fixed naturally with a metal sintered body. In the case where first connecting portion 27 and second connecting portions 28a to 28c are each formed of a metal sintered body, preferably a laminated body is produced, then first connecting portion 27A and cathode terminal 26 are superposed on the laminated body, and thereafter the heating process is performed to sinter the metal nanoparticles. In this case, one heating process can form all sintered bodies.

EXAMPLES

In the following, the present invention will be described in more detail in connection with Examples. The present invention, however, is not limited to them.

Example 1

In Example 1, a solid electrolytic capacitor having the structure shown in FIG. 1 was produced. Example 1 will be described below with reference to FIG. 1.

1. Preprocess

A known method was used first to prepare tantalum powder. One end of a tantalum wire was embedded in the tantalum powder and, in this state, the tantalum powder was molded into the shape of a rectangular parallelepiped. This was then sintered to form anode portion 11 in which one end of anode lead portion 12 was embedded as shown in FIG. 1. At this time, anode portion 11 had dimensions of length×width×height of 1 mm×1 mm×2 mm.

Next, in a chemical conversion process, anode portion 11 was immersed in an aqueous solution of phosphoric acid, and a voltage was applied to form dielectric coating 13 of Ta$_2$O$_5$ on the surface of anode portion 11. Then, pyrrole was used as a monomer which underwent chemical polymerization and electrolytic polymerization to form solid electrolyte 14 of a pyrrole polymer on dielectric coating 13. Subsequently, a known technique was followed to form cathode lead portion 15 including a carbon layer as an inner layer and a silver paint layer as an outer layer. Here, the carbon layer is made up of carbon particles and the silver paint layer is made up of silver particles. This process was performed to produce capacitor element 10.

2. Laminated Body Forming Process

On one surface on an end of cathode terminal 17 in which an Ni plating layer, a Pd plating layer, and an Au plating layer were formed in order on a copper alloy which was a base material, connecting member 18A was applied. On the applied connecting member 18A, cathode lead portion 15 of capacitor element 10 was placed to produce laminated body 40. As connecting member 18A, a solvent mixture containing 90% by mass of silver nanoparticles with an average particle size of 50±40 nm was used, and the solvent mixture was applied onto a flat surface of cathode terminal 17 to extend with a length×width of 2 mm×2 mm and a thickness of 20±5 µm. As the solvent mixture, N-methyl-2-pyrrolidone (NMP) was used. The average particle size of silver nanoparticles was measured with a transmission electron microscope.

3. Laminated Body Heating Process

Laminated body 40 produced in the above-described process was placed in a heating furnace and heated at 210° C. for two minutes. This heating process removed the solvent and sintered the silver nanoparticles. Accordingly, connecting portion 18 formed of a sintered body located between cathode terminal 17 and cathode lead portion 15 to fix cathode terminal 17 and cathode lead portion 15 to each other was formed.

4. Postprocess

After the above-described process, to the exposed end of anode lead portion 12, anode terminal 16 of copper was welded. Capacitor element 10, one end of anode terminal 16 connected to anode lead portion 12, and one end of cathode terminal 17 connected to connecting portion 18 were sealed with an epoxy resin, and finally aging was performed to produce solid electrolytic capacitor 100. The produced solid electrolytic capacitor had a rated voltage of 2 V and a rated capacitance of 270 µF.

Comparative Example 1

A solid electrolytic capacitor was produced by a method similar to that of Example 1 except that the laminated body forming process used a conventional conductive adhesive instead of connecting member 18A and applied the conductive adhesive to extend with a length×width of 2 mm×2 mm and a thickness of 20±5 µm. The conductive adhesive used here was a paste in which silver particles of 50 µm±45 µm were mixed with an epoxy resin, and the content of the silver particles in the paste was 80% by mass. The produced solid electrolytic capacitor had a rated voltage of 2 V and a rated capacitance of 270 µF.

<Performance Evaluation>

For 20 solid electrolytic capacitors of Example 1 and Comparative Example 1 each, an LCR meter for four-terminal measurement was used to measure the ESR (mΩ) at a frequency of 100 kHz of each solid electrolytic capacitor under an environment condition of 20° C. The measurement was taken with Precision LCR Meter 4284A (manufactured by Hewlett Packard Company). The average of the taken measurements was calculated. The result of this is shown in Table 1.

TABLE 1

|  | Average (mΩ) | Max (mΩ) | Min (mΩ) |
|---|---|---|---|
| Example 1 | 9.8 | 10.5 | 9.2 |
| Comparative Example 1 | 12.1 | 13.4 | 11.2 |

In Table 1, "Max" represents a maximum ESR value and "Min" represents a minimum ESR value among respective ESR values of the 20 solid electrolytic capacitors measured for each of Example 1 and Comparative Example 1. "Average" represents an average of respective ESR values of the 20 solid electrolytic capacitors.

It has been found from Table 1 that the ESR value of the solid electrolytic capacitors of Example 1 is lower than the ESR value of the solid electrolytic capacitors of Comparative Example 1. In other words, for fixation of the cathode lead portion and the cathode terminal to each other, the sintered body formed by sintering silver nanoparticles can be used instead of the conventional conductive adhesive to lower the ESR value of the solid electrolytic capacitor.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A method of manufacturing a solid electrolytic capacitor comprising a capacitor element including a dielectric coating, a solid electrolyte, and a cathode lead portion formed in order on a surface of an anode portion having an anode lead portion, the method comprising the steps of:

superposing a connecting member and a cathode terminal in this order on a surface of said cathode lead portion to form a laminated body; and heating said laminated body, said connecting member being formed of metal nanoparticles and a solvent, and said heating step removing said solvent and sintering said metal nanoparticles to form a sintered body which fixes said cathode lead portion and said cathode terminal to each other.

2. The method of manufacturing a solid electrolytic capacitor according to claim 1, wherein a content of the metal nanoparticles in said connecting member is not less than 85% by mass.

3. The method of manufacturing a solid electrolytic capacitor according to claim 1, wherein said metal nanoparticles are silver nanoparticles.

4. The method of manufacturing a solid electrolytic capacitor according to claim 3, wherein a heating temperature in said heating step is not lower than 120° C. and not higher than 220° C.

5. A method of manufacturing a solid electrolytic capacitor comprising a plurality of capacitor elements each including a dielectric coating, a solid electrolyte, and a cathode lead portion formed in order on a surface of an anode portion having an anode lead portion, said plurality of capacitor elements being superposed on each other, the method comprising the steps of:

superposing a connecting member and a cathode terminal in this order on a surface of the cathode lead portion of at least one capacitor element of said plurality of capacitor elements to form a laminated body; and heating said laminated body, said connecting member being formed of metal nanoparticles and a solvent, and said heating step removing said solvent and sintering said metal nanoparticles to form a sintered body which fixes said cathode lead portion and said cathode terminal to each other.

6. A method of manufacturing a solid electrolytic capacitor comprising a plurality of capacitor elements each including a dielectric coating, a solid electrolyte, and a cathode lead portion formed in order on a surface of an anode portion having an anode lead portion, said plurality of capacitor elements being superposed on each other, the method comprising the steps of:

superposing, on a surface of the cathode lead portion of one capacitor element of said plurality of capacitor elements, a connecting member and the cathode lead portion of another capacitor element in this order to form a laminated body; and heating said laminated body, said connecting member being formed of metal nanoparticles and a solvent, and said heating step removing said solvent and sintering said metal nanoparticles to form a sintered body which fixes the cathode lead portion of said one capacitor element and the cathode lead portion of said another capacitor element to each other.

* * * * *